United States Patent
Guillemette et al.

(10) Patent No.: US 8,696,859 B2
(45) Date of Patent: Apr. 15, 2014

(54) BONDING OF SILICONE GASKETS AND SYSTEMS CONTAINING BONDED SILICONE GASKETS

(75) Inventors: Robert Guillemette, Durham, CT (US); Robert Vingenzo Luchenta, Norwalk, CT (US); John Bartalotta, New Britain, CT (US); Mark Stephen Halvorsen, Madison, CT (US); James S. Giampapa, Oxford, CT (US); Karl Ulsamer, West Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1078 days.

(21) Appl. No.: 11/954,340

(22) Filed: Dec. 12, 2007

(65) Prior Publication Data
US 2010/0007099 A1    Jan. 14, 2010

(51) Int. Cl.
B29C 65/00 (2006.01)
B32B 37/00 (2006.01)

(52) U.S. Cl.
USPC ............ 156/308.6; 156/155; 156/325

(58) Field of Classification Search
USPC ........ 156/71, 272.6, 153, 155, 308.6, 308.8, 156/309.3, 325, 326, 327; 174/351–358, 174/370
See application file for complete search history.

(56) References Cited

U.S. PATENT DOCUMENTS

| | | | | |
|---|---|---|---|---|
| 3,347,978 A | * | 10/1967 | Simon et al. | 174/84 R |
| 4,977,295 A | | 12/1990 | Chin et al. | |
| 5,045,635 A | * | 9/1991 | Kaplo et al. | 174/354 |
| 5,621,062 A | * | 4/1997 | Castellucci et al. | 528/30 |
| 5,776,549 A | | 7/1998 | Larson | |
| 5,910,524 A | | 6/1999 | Kalinoski | |
| 6,294,620 B1 | * | 9/2001 | Huang et al. | 525/452 |
| 6,784,363 B2 | * | 8/2004 | Jones | 174/351 |

FOREIGN PATENT DOCUMENTS

| | | | |
|---|---|---|---|
| JP | 07126579 A | * | 5/1995 |
| WO | 2006/029145 | | 3/2006 |

OTHER PUBLICATIONS

Machine translation of JP 07-126579 date unknown.*
International Search Report dated Sep. 30, 2009.
Supplementary European Search Report for European Patent Application No. 08872401.8 completed on Jul. 8, 2013.

* cited by examiner

*Primary Examiner* — John Goff
(74) *Attorney, Agent, or Firm* — Carlson, Gaskey & Olds, P.C.

(57) ABSTRACT

A method of bonding an electrically conductive silicone gasket includes activating selected surfaces of the electrically conductive silicone gasket, applying a sealant having a corrosion inhibitor to at least a portion of the activated selected surfaces, and curing the sealant to thereby bond the electrically conductive silicone gasket with a substrate.

12 Claims, 2 Drawing Sheets

BONDING OF SILICONE GASKETS AND SYSTEMS CONTAINING BONDED SILICONE GASKETS

STATEMENT OF SPONSORED DEVELOPMENT

The government may have certain rights to this invention pursuant to Contract No. DAAH23-02-C-0006 awarded by the United States Navy and United States Army.

BACKGROUND OF THE INVENTION

This disclosure relates to electrically conductive silicone components and, more particularly, to a system and method for bonding an electrically conductive silicone component using a sealant having a corrosion inhibitor.

Silicone components, such as gaskets, are known and used in a variety of different applications. For example, a silicone gasket may be used to provide a seal between two metal surfaces that may be otherwise difficult to seal together. Silicone adhesives are exclusively used to hold the silicone gasket in a desired position relative to the metal surfaces because of favorable bonding compatibility between the silicone adhesive and the silicone gasket. Although effective for certain applications, silicone adhesives have inherent drawbacks in some applications, which others have failed to overcome. These may include an incompatibility with electrical conductivity and corrosion protection additives, marginal adhesion to metallic substrates, and poor chemical resistance to fluids typically used on aircraft.

SUMMARY

Exemplary gasket systems and methods disclosed herein facilitate strong bonding between an electrically conductive silicone gasket, a sealant having a corrosion inhibitor, and a metallic surface.

One example method of bonding includes activating selected surfaces of an electrically conductive silicone gasket, applying a sealant having a corrosion inhibitor to at least a portion of the activated selected surfaces, and curing the sealant to thereby bond the electrically conductive silicone gasket onto a substrate.

An example gasket system includes an electrically conductive silicone gasket, a metal substrate, and a sealant bonding the electrically conductive silicone gasket and the metal substrate together. For example, the sealant may include a corrosion inhibitor to control corrosion of the metal substrate.

In a further example, the electrically conductive silicone gasket is fluorosilicone and the metal substrate is alodined aluminum. Additionally, the sealant may be formed from polysulfide or polythioether and include a metal filler for electrical conductivity and a corrosion inhibitor.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

As noted above, others have failed to overcome inherent drawbacks in some applications of silicone adhesives. For example, the chemical nature of silicone adhesives make them effectively incompatible with electrical conductivity and incorporation of sacrificial corrosion inhibitor pigments. Thus, using silicone adhesives precludes an acceptable degree of corrosion protection. Also, where electrical conductivity between metal surfaces through the silicone gasket is desired, it has been necessary to limit areas of application of the silicone adhesive on the silicone gaskets to avoid electrically insulating the silicone gasket. Furthermore, the limited areas of application may not provide a desirable degree of bonding and sealing. Exemplary embodiments disclosed herein improve this situation.

Figure 1:
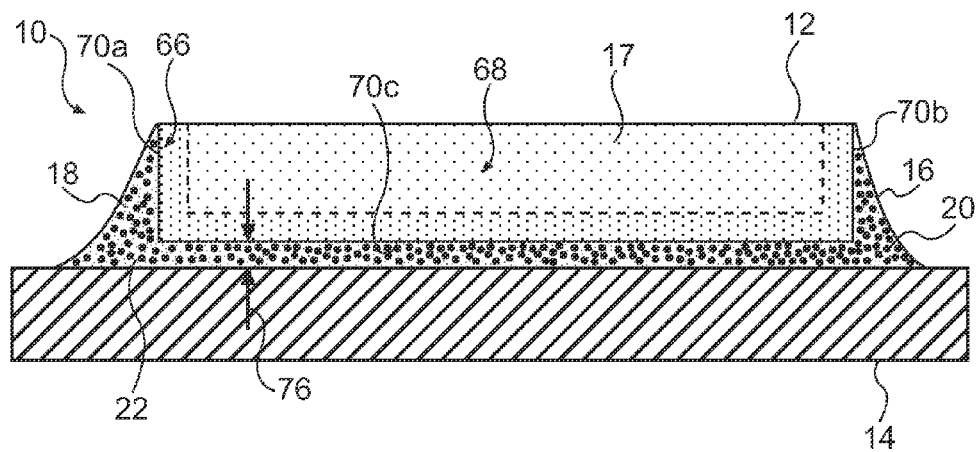
FIG. 1 illustrates selected portions of an example gasket system.

Turning now to FIG. 1, this figure illustrates selected portions of an example gasket system 10. In this example, the gasket system 10 includes an electrically conductive silicone gasket 12 that is bonded with a metal substrate 14. A sealant 16 bonds the electrically conductive silicone gasket 12 with the metal substrate 14. As will be described, the sealant 16 provides adhesive and cohesive bonding between the gasket 12 and the metal substrate 14, a level of corrosion protection, and electrical conductivity, the combination of which has not been previously achieved using silicone adhesives to bond silicone gaskets.

The electrically conductive silicone gasket 12 may be formed from any type of silicone, such as fluorosilicone, and includes an electrically conductive filler 17 to provide the gasket 12 with electrical conductivity properties. For example, the electrically conductive filler 17 may include a metal in an amount suitable for achieving a desired level of electrical conductivity of the gasket 12. For example, the electrical conductivity may be represented by electrical resistivity and could be about 2.5 mOhm. Given this description, one of ordinary skill in the art will recognize other levels of resistivity to meet their particular needs. Additionally, the electrically conductive silicone gasket 12 may be formed in any suitable method, such as by molding or extrusion, into any desired shape.

The metal substrate 14 may be any suitable type of metal for an intended use. For example, the metal substrate 14 may be aluminum. In a further example, the metal substrate 14 may be alodined aluminum, which includes a chromate conversion coating for corrosion protection. As can be appreciated, the metal substrate 14 may alternatively be formed from other types of metals, depending upon the intended use.

In an exemplary embodiment, the sealant 16 is also electrically conductive. In this regard, the sealant 16 includes a polymer matrix 18 and a metal filler 20 dispersed through the polymer matrix 18 to provide the electrical conductivity. For example, the metal filler 20 may be provided in an amount suitable for achieving a desired level of electrical conductivity of the sealant 16. The metal filler 20 may include nickel particles or other type of metal or non-metal filler, like carbon, suitable for providing electrical conductivity.

The sealant 16 may also provide a degree of corrosion protection to the metal substrate 14. The sealant 16 includes, in an exemplary embodiment, a non-chromate corrosion inhibitor 22 that is also dispersed through the polymer matrix 18. The non-chromate corrosion inhibitor 22 may leach out of the sealant 16 over time and react with (e.g., passivate) corrosive chemical species from the environment to thereby prevent or limit corrosive attack on the metal substrate 14. Alternatively, other types of corrosion inhibitors may be utilized within the sealant 16, depending upon the needs of a particular intended use.

The polymer matrix 18 may be selected from a variety of different types of non-silicone polymers. For example, the polymer matrix 18 might include polythioether or polysulfide. Polythioether and polysulfide have relatively high resistance to organic fuels and oils, and a relatively high resistance to temperature. Thus, in some examples, polythioether and polysulfide may be well suited for environments typically associated with an aircraft. Furthermore, in an exemplary embodiment, polythioether and polysulfide are compatible with the metal filler 20 and the non-chromate corrosion inhibitor 22 to provide electrical conductivity and facilitate corrosion protection of the metal substrate 14. For example, the term "compatible" refers to the polythioether or polysulfide of the sealant 16 being relatively chemically stable as compared to the metal filler 20 and the non-chromate corrosion inhibitor 22 and/or the metal filler 20 and the non-chromate corrosion inhibitor 22 not preventing the desired adhesive and cohesive bonding. Further, these types of polymer matrices exhibit a far superior degree of cohesive bonding to metallic surfaces in comparison to silicon adhesives.

Figure 2:
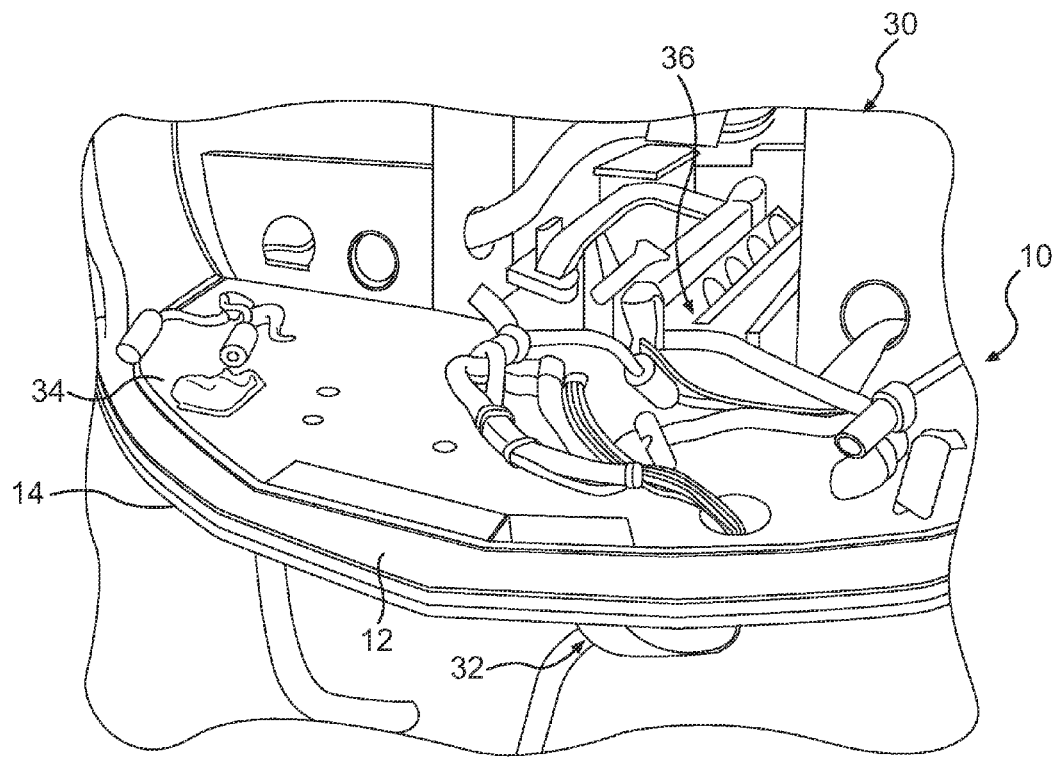
FIG. 2 illustrates selected portions of an example implementation of a gasket system in a portion of an aircraft airframe.

FIG. 2 illustrates selected portions of one example implementation of the gasket system 10, such as in 30 aircraft (e.g., airplane, helicopter, etc.). In this example, the metal substrate 14 forms a portion of an aircraft airframe 32. A panel 34 is mounted on the aircraft airframe 32 and shields an electrical compartment 36 (e.g., containing electrical components, wiring, etc.) of the aircraft from the elements of the surrounding environment and from electromagnetic interference. In this regard, the panel 34 may be formed of an electromagnetic shielding material, such as aluminum. The gasket 12 provides a seal between the panel 34 and the aircraft airframe 32. As can be appreciated, the electrically conductive silicone gasket 12 may be used in other areas of an aircraft or in non-aerospace applications.

Figure 3:
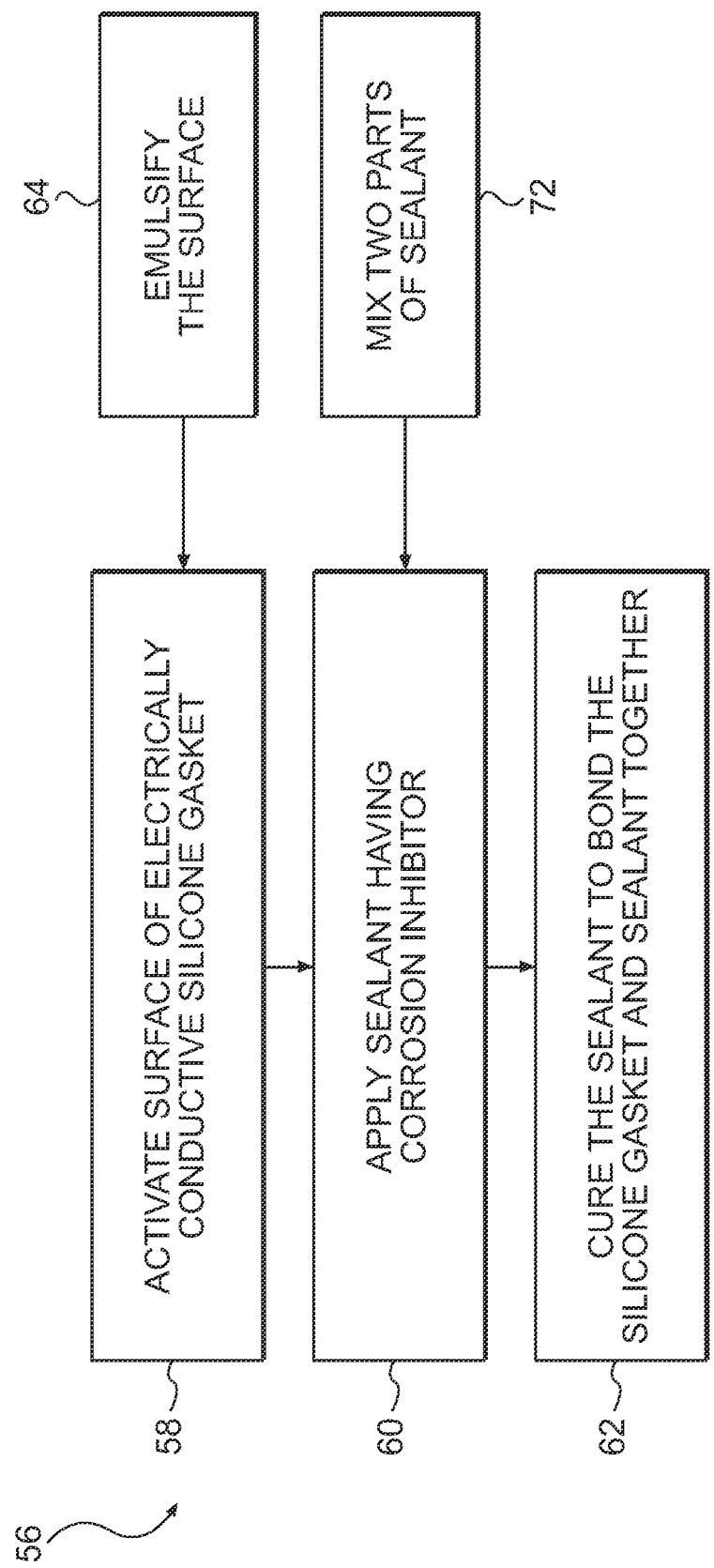
FIG. 3 illustrates an example method of bonding an electrically conductive silicone gasket in a gasket system.

FIG. 3 illustrates an example method 56 of bonding the electrically conductive silicone gasket 12 to form the above-described gasket system 10. The example method 56 facilitates forming an adhesive and cohesive bond between the gasket 12 and the metal substrate 14 using the sealant 16. Mere application of a non-silicone sealant to a silicone gasket without applying the principles of the method 56 will not provide adhesive and cohesive bonding. In this example, the method 56 generally includes an activating action 58, an application action 60, and a curing action 62. Other actions may optionally be used in combination with these actions.

The activation action 58 includes activating a surface of the electrically conductive gasket 12 for adhesive and cohesive bonding with the sealant 16. For example, the activation action 58 may include an emulsifying action 64 that is used to activate the electrically conductive gasket 12. An emulsifier may be applied before bonding the gasket 12 with the metal substrate 14 to selected surface portions of the electrically conductive silicone gasket 12 that are to be bonded with the sealant 16. For example, the emulsifier is applied to sides 70a and 70b and bottom 70c of the electrically conductive silicone gasket 12. The emulsifier produces a surface-activated region 66 that is receptive for adhesive and cohesive bonding with the sealant 16. For example, the emulsifier may dissolve and remove a portion of the polymer matrix 18 from the surface-activated region 66 such that the surface-activated region 66 includes a relatively greater amount of the metal filler 17 than an underlying subsurface region 68 of the gasket 12 that is not emulsified. Thus, the surface-activated region 66 includes a greater amount of exposed metal filler 17, which adhesively bonds with the sealant 16. That is, the silicone of the gasket is not necessarily compatible with adhesive bonding to the sealant 16, and removing a potion of the silicone thereby produces additional sites (e.g., in the metal filler 17) suitable for cohesive bonding.

Additionally, or alternatively to removing the polymer matrix of the gasket 12, the emulsifier may partially dissolve the silicone material of the gasket 12 to thereby chemically activate the silicone for chemically bonding with the sealant 16. For example, chemical bonding may be suitable to facilitate cohesive bonding between the gasket 12 and the sealant 16. As can be appreciated, the activation mechanism may be a combination of the above examples or may include other mechanisms, depending upon the type of emulsifier that is used.

The emulsifier may include any suitable type of emulsifier for dissolving or activating the surface of the electrically conductive silicone gasket 12. For example, the emulsifier includes at least one emulsifying agent selected from dimethylacetamide, ammonium, and glycol ether. The ammonium may be in the form of a quarternary ammonium compound. In a further example, the emulsifier includes a mixture of the dimethylacetamide, ammonium, and glycol ether. One example mixture is a commercially available emulsifier known as POLYGONE® 500-AG.

The emulsifier may be applied to selected surfaces of the electrically conductive silicone gasket 12 using any suitable method. For example, the emulsifier is wiped, brushed, sprayed, or otherwise applied onto selected surfaces of the gasket 12 using a brush, cloth, or other suitable applicator. Excess emulsifier may then be removed from the surfaces of the gasket 12, such as by wiping the surfaces with a dry cloth. The emulsifier may be applied to the surfaces of the gasket for an exposure time of about one minute before drying. However, as can be appreciated, the exposure time may depend upon the amount and type of emulsifier that is applied, and a degree of desired activation.

Subsequent to the activation action 58, the sealant 16 is applied to the electrically conductive silicone gasket 12. For example, the sealant 16 may be applied directly to the surface-activated region 66 of the gasket 12, applied to the metal substrate 14 and then brought into contact with the electrically conductive silicone gasket 12, or applied to both the gasket 12 and the metal substrate 12.

If polythioether or polysulfide is selected for the polymer matrix 18, a mixing action 72 may be needed to form the polymer matrix 18. The mixing action 72 may include mixing a sealant base component with a sealant catalyst component (i.e., a two-part system) to initiate a polymerization reaction which results in formation of the polythioether or polysulfide (depending on the types of base and catalyst components used). The metal filler 20 and the non-chromate corrosion inhibitor 22 may already be incorporated into the sealant base component or mixed in separately.

Upon mixing, the sealant 16 begins the curing process of the curing action 62. Thus, the curing action 62 may thereby be integrated with the application action 60 upon mixing of the sealant and catalyst components. Additionally, other curing actions, such as heating at an elevated temperature, may be used to facilitate the curing process. Upon curing, the sealant 16 adhesively bonds the electrically conductive silicone gasket 12 with the metal substrate 14. In this regard, the sealant 16 provides a relatively strong bond that is electrically conductive and corrosion resistant.

The sealant 16 may be used in any suitable amount between the electrically conductive silicone gasket 12 and the metal substrate 14. In one example, the sealant 16 is applied with a thickness 76 (FIG. 1) that is about 0.005 inches (0.127 mm). As can be appreciated, other thicknesses may be used. However, in this example, the thickness of 0.005 inches is suitable for adhesively bonding the electrically conductive silicone gasket 12 to the metal substrate 14 with a desired level of electrical conductivity.

As mentioned, the sealant 16 also provides the advantage of adhesively bonding the electrically conductive silicone gasket 12 with the metal substrate 14. That is, if the gasket 12 is peeled from the metal substrate 14, the peeling occurs through the sealant 16 rather than interfacially between the gasket 12 and the sealant 16 or interfacially between the sealant 16 and the metal substrate 14. In a further example, the bonding may be a combination of cohesive bonding and adhesive bonding (e.g., interfacial peeling), with cohesive bonding being predominant. For example, the type of peeling may be determined through known peeling testing.

The sealant 16 of certain exemplary embodiments above thereby provides the advantage of adhesively bonding the electrically conductive silicone gasket 12 with the metal substrate 14 in combination with providing electrical conductivity and facilitating corrosion protection.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can be determined by studying the following claims.

What is claimed is:

1. A method of bonding an electrically conductive silicone gasket, comprising:
   providing an electrically conductive silicone gasket having a silicone matrix with a metal filler dispersed there through;
   activating selected surfaces of the electrically conductive silicone gasket by applying at least one emulsifier to the selected surfaces, and using the emulsifier to remove a portion of the silicone matrix and expose the metal filler at the selected surfaces;
   after the activating, directly contacting a sealant comprising polythioether or polysulfide and a corrosion inhibitor with the exposed metal filler of the selected surfaces of the electrically conductive silicone gasket; and
   curing the sealant to thereby bond the electrically conductive silicone gasket on a substrate.

2. The method as recited in claim 1, further comprising mixing a sealant base component with a sealant catalyst component to form the sealant.

3. The method as recited in claim 1, further comprising forming the sealant of polythioether.

4. The method as recited in claim 1, further comprising forming the sealant of polysulfide.

5. The method as recited in claim 1, further comprising forming the sealant of an electrically conductive composite material.

6. The method as recited in claim 1, further comprising adhesively bonding the sealant with the electrically conductive silicone gasket.

7. The method as recited in claim 1, wherein the sealant adhesively and cohesively bonds with the exposed metal filler.

8. The method as recited in claim 1, wherein the emulsifier is selected from dimethylacetamide, ammonium, and glycol ether.

9. The method as recited in claim 1, wherein the emulsifier is glycol ether.

10. The method as recited in claim 1, wherein the emulsifier is ammonium.

11. The method as recited in claim 1, wherein the emulsifier is dimethylacetamide.

12. The method as recited in claim 1, including applying the emulsifier to the the selected surfaces and then drying the emulsifier to expose the metal filler for direct contact with the sealant.

* * * * *